(12) United States Patent
Hashiguchi

(10) Patent No.: US 8,912,685 B2
(45) Date of Patent: Dec. 16, 2014

(54) NONCONTACT ELECTRIC POWER FEEDING APPARATUS, NONCONTACT ELECTRIC POWER RECEIVING APPARATUS, NONCONTACT ELECTRIC POWER FEEDING METHOD, NONCONTACT ELECTRIC POWER RECEIVING METHOD, AND NONCONTACT ELECTRIC POWER FEEDING SYSTEM

(75) Inventor: Takaaki Hashiguchi, Tokyo (JP)

(73) Assignee: Sony Corporation, Tokyo (JP)

( * ) Notice: Subject to any disclaimer, the term of this patent is extended or adjusted under 35 U.S.C. 154(b) by 599 days.

(21) Appl. No.: 12/847,498

(22) Filed: Jul. 30, 2010

(65) Prior Publication Data

US 2011/0049995 A1    Mar. 3, 2011

(30) Foreign Application Priority Data

Aug. 26, 2009  (JP) .................................. 2009-195172

(51) Int. Cl.
*H02J 17/00*     (2006.01)
*H02J 5/00*      (2006.01)
*H02J 7/02*      (2006.01)

(52) U.S. Cl.
CPC  *H02J 7/025* (2013.01); *H02J 5/005* (2013.01)
USPC .......................................... 307/104; 320/108

(58) Field of Classification Search
CPC .................................. H02J 17/00; H02F 1/00
USPC ........................................................ 307/104
See application file for complete search history.

(56) References Cited

U.S. PATENT DOCUMENTS

| | | | |
|---|---|---|---|
| 2004/0095291 A1 | 5/2004 | Shigemasa et al. | |
| 2004/0124779 A1* | 7/2004 | Howald et al. ........... | 315/111.51 |
| 2004/0130915 A1 | 7/2004 | Baarman | |
| 2007/0145830 A1 | 6/2007 | Lee et al. | |
| 2007/0222542 A1 | 9/2007 | Joannopoulos et al. | |
| 2008/0067874 A1 | 3/2008 | Tseng | |
| 2009/0015075 A1* | 1/2009 | Cook et al. ..................... | 307/149 |
| 2009/0058190 A1 | 3/2009 | Tanaka | |
| 2009/0243397 A1* | 10/2009 | Cook et al. ..................... | 307/104 |
| 2011/0266880 A1 | 11/2011 | Kim et al. | |

FOREIGN PATENT DOCUMENTS

| | | |
|---|---|---|
| JP | 11-188113 A | 7/1999 |
| JP | 2001-238372 A | 8/2001 |
| WO | WO 2009/089146 A1 | 7/2009 |
| WO | WO 2011/033660 A1 | 3/2011 |

OTHER PUBLICATIONS

Extended European Search Report issued Aug. 14, 2012 in European Patent Application No. 10007328.7.

* cited by examiner

*Primary Examiner* — Rexford Barnie
*Assistant Examiner* — Toan Vu
(74) *Attorney, Agent, or Firm* — Oblon, Spivak, McClelland, Maier & Neustadt, L.L.P.

(57) ABSTRACT

Disclosed herein is a noncontact electric power feeding apparatus, including: a resonance element for supplying an alternative current electric power in a noncontact style in accordance with a resonance; an alternative current power source portion configured to generate an alternative current electric power to be supplied to said resonance element; and impedance adjusting portion provided between said alternative current power source portion and said resonance element and configured to variably control an impedance in accordance with a coupling coefficient between said noncontact electric power feeding apparatus and an electric power feeding destination of the alternative current electric power.

9 Claims, 9 Drawing Sheets

NONCONTACT ELECTRIC POWER FEEDING APPARATUS, NONCONTACT ELECTRIC POWER RECEIVING APPARATUS, NONCONTACT ELECTRIC POWER FEEDING METHOD, NONCONTACT ELECTRIC POWER RECEIVING METHOD, AND NONCONTACT ELECTRIC POWER FEEDING SYSTEM

BACKGROUND OF THE INVENTION

1. Field of the Invention

The present invention relates to noncontact electric power feeding apparatus and method for feeding an electric power by using a resonance such as a magnetic field resonance or an electric field resonance, noncontact electric power receiving apparatus and method for receiving the electric power by using the resonance such as the magnetic field resonance or the electric field resonance, and a noncontact electric power feeding system for feeding the electric power by using the resonance such as the magnetic field resonance or the electric field resonance.

2. Description of the Related Art

An electromagnetic induction system and a magnetic field resonance system are each known as a technique for enabling an electric energy to be transmitted in a noncontact style. Also, the electromagnetic induction system and the magnetic field resonance system are different in various respects from each other. In recent years, the energy transmission using the magnetic field resonance system attracts attention.

FIG. 8 is a conceptual diagram, partly in circuit, showing a basic configuration of a noncontact electric power feeding system using the magnetic field resonance system. The noncontact electric power feeding system using magnetic field resonance system is composed of an electric power feeding side (electric power feeding apparatus) 100, and an electric power receiving side (electric power receiving apparatus) 200.

The electric power feeding side 100 includes an A.C. power source 101 and a resonance element 102. The A.C. power source 101 generates an A.C. electric power (A.C. current) having the same self-resonance frequency as that of the resonance element 102 and supplies the A.C. electric power thus generated to the resonance element 102.

The electric power receiving side 200 is composed of a resonance element 201 and a load circuit 202. The resonance element 101 of the electric power feeding side 100 and the resonance element 201 of the electric power receiving side 200 are identical in self-resonance frequency to each other, and are coupled to each other through magnetic field coupling.

Therefore, the A.C. electric power generated by the A.C. power source 102 of the electric power feeding side 100 is supplied to the resonance element 102, thereby generating the magnetic field in the resonance element 102. Also, the magnetic field coupling is caused between the resonance element 102 of the electric power feeding side 100, and the resonance element 201 of the electric power receiving side 200 to induce the A.C. electric power in the resonance element 201 of the electric power receiving side 200. The A.C. electric power thus induced is supplied to the load circuit 202.

However, in the case of the noncontact electric power feeding system using the magnetic field resonance system shown in FIG. 8, in the electric power feeding side 100, reflection of the electric power is caused between the A.C. power source 101 and the resonance element 102. Likewise, in the electric power receiving side 200, the reflection of the electric power is caused between the resonance element 201 and the load circuit 202. For this reason, it may be impossible to efficiently carry out the power transmission.

In addition, in the noncontact electric power feeding system using the magnetic field resonance system, normally, an unmodulated sine wave having a central frequency $f_o$ is used as the A.C. power. Since this unmodulated sine wave is unmodulated one, an occupied frequency bandwidth is narrow (ideally 0 (zero) Hz).

Therefore, a frequency band necessary for the resonance coil through which the unmodulated sine wave is transmitted has to be as narrow as about several hertz. However, for the purpose of increasing a transmission efficiency, it is required for a resonance circuit that a loss is low ("a Q value" is large). Here, it is noted that "the Q value" represents the sharpness of the peak of the resonance in the resonance circuit, and thus when the peak of the resonance becomes sharp, it is possible to increase the transmission efficiency of the A.C. electric power.

In a word, in order to obtain the high transmission efficiency in the noncontact electric power transmission using the magnetic field resonance system, it is preferable to increase the Q value as much as possible in both the resonance element 102 of the electric power feeding side 100, and the resonance element 201 of the electric power receiving side 200.

As shown in FIG. 8, however, when the resonance element 102 is directly connected to the A.C. power source 101 on the electric power feeding side 100, the Q value of the resonance element 102 is reduced due to the influence of circuit impedance. Likewise, when the resonance element 201 is directly connected to the A.C. load circuit 202 on the electric power receiving side 200 as well, the Q value of the resonance element 201 is reduced due to the influence of circuit impedance.

Then, for the purpose of preventing both the reflection of the electric power, and the reduction of the Q value, there is adopted a configuration such that excitation elements are used in both the electric power feeding side 100 and the electric power receiving side 200, respectively.

FIG. 9 is a block diagram showing an example of a configuration of a noncontact electric power feeding system, using a magnetic field resonance system, which is configured in order to prevent both the reflection of the electric power, and the reduction of the Q value by providing excitation elements in both the electric power feeding side 100 and the electric power receiving side 200, respectively.

As shown in FIG. 9, the electric power feeding side 100 has a configuration such that an excitation element 103 is provided between the A.C. power source 101 and the resonance element 102. The electric power receiving side 200 has a configuration such that an excitation element 203 and a rectifying circuit 204 are provided between the resonance element 201 and the load circuit 202.

Here, the electric power feeding side 100, for example, is realized in the form of a charging apparatus or the like. Also, the electric power receiving side 200, for example, is realized in the form of a mobile electronic apparatus such as a mobile-phone unit.

Also, the inside of the electric power feeding side 100 is configured in such a way that the excitation element 103 is connected to the A.C. power source 101, and the excitation element 103 and the resonance element 102 are strongly coupled to each other through the electromagnetic induction. Likewise, the inside of the electric power receiving apparatus 200 is configured in such a way that the resonance element 201 and the excitation element 203 are strongly coupled to each other through the electromagnetic induction, the excitation element 203 is connected to the rectifying circuit 204, and the rectifying circuit 204 and the load circuit 202 are connected to each other.

Also, similarly to the case of the noncontact electric power transmission system shown in FIG. 8 when the resonance element 102 of the electric power feeding side 100, and the resonance element 201 of the electric power receiving side 200 agree in self-resonance frequency to each other, the resonance element 102 of the electric power feeding side 100, and the resonance element 201 of the electric power receiving side 200 show a magnetic field resonance relationship. As a result, a coupling amount becomes maximum, and a loss becomes minimum.

That is to say, in the noncontact electric power feeding system shown in FIG. 9, firstly, in the electric power feeding side 100, an A.C. electric power (A.C. current) having a predetermined frequency is supplied from the A.C. power source 101 to the excitation element 103, which results in that an A.C. electric power is induced in the resonance element 102 through the electromagnetic induction. Here, a frequency of the A.C. electric power generated in the A.C. power source 101 is set as being identical to each of a self-resonance frequency of the resonance element 102 of the electric power supply source, and a self-resonance frequency of the resonance element 201 of the electric power supply destination.

Also, as described above, the resonance element 102 of the electric power feeding side 100, and the resonance element 201 of the electric power receiving side 200 are disposed so as to show the magnetic field resonance relationship. Thus, the A.C. electric power is supplied from the resonance element 102 to the resonance element 201 at a resonance frequency in a noncontact style.

In the electric power receiving side 200, the A.C. electric power supplied from the resonance element 102 of the electric power feeding side 100 is received by the resonance element 201. The A.C. electric power from the resonance element 201 is supplied to the rectifying circuit 204 via the excitation element 203 through the electromagnetic induction, and is then converted into a D.C. electric power (D.C. current) in the rectifying circuit 204 to be supplied to each of the various kinds of load circuits 202.

In the manner described above, the D.C. electric power is supplied from the electric power feeding side 100 to the electric power receiving side 200 in the noncontact style. It is noted that the D.C. electric power outputted from the rectifying circuit 204, for example, is supplied to a charging circuit as the load circuit 202 to which a battery is connected, thereby being used to charge the battery with the electricity.

Also, the following features are obtained in the noncontact electric power feeding system in which the electric power feeding side and the electric power receiving side which are configured in the manner as shown in FIG. 9 show one-to-one correspondence.

The noncontact electric power feeding system concerned has a relationship, as shown in FIG. 10, between the frequency of the A.C. power source and the coupling amount. As can be seen from FIG. 10, even when the frequency of the A.C. power source is low, or conversely the frequency of the A.C. power source is high, the coupling amount does not become large. Thus, the coupling amount becomes maximum only at a specific frequency at which a magnetic field resonance phenomenon is caused. That is to say, the magnetic field resonance allows the frequency property of the coupling amount to show a frequency selectivity property.

In addition, the noncontact electric power feeding system concerned has a relationship, as shown in FIG. 11, between a distance between the resonance elements 102 and 201, and the coupling amount. As can be seen from FIG. 12, the coupling amount is reduced as the distance between the resonance elements 102 and 201 becomes longer.

However, the coupling amount does not become large just because the distance between the resonance elements 102 and 201 is short. Thus, the distance at which the coupling amount becomes maximum exists at a certain resonance frequency. In addition, as apparent from FIG. 11, it is also possible to ensure a certain or more coupling amount as long as the distance between the resonance elements 102 and 201 falls within a certain range.

In addition, the noncontact electric power feeding system has a relationship, as shown in FIG. 12, between the resonance frequency and the inter-resonance element distance at which the maximum coupling amount is obtained. That is to say, it is understood from FIG. 12 that when the resonance frequency is low, the resonance element interval is wide. In addition, it is also understood from FIG. 12 that when the resonance frequency is high, the maximum coupling amount can be obtained by narrowing the resonance element interval.

In the noncontact electric power feeding system using the electromagnetic induction system which has been currently widely used, the electric power feeding side and the electric power receiving side need to have a magnetic flux in common. For the purpose of efficiently feeding the electric power, the electric power feeding source and the electric power feeding destination need to be disposed close proximity to each other, and thus the axis alignment for the coupling between the electric power feeding source and the electric power feeding destination becomes also important.

On the other hand, the noncontact electric power feeding system using the magnetic field resonance phenomenon, as described above, has an advantage that from the principles called the magnetic field resonance phenomenon, the electric power can be transmitted at a longer distance than that in the case of the noncontact electric power feeding system using the electromagnetic induction system, and even when the axis alignment is slightly poor, the electric power transmission efficiency is not reduced so much.

Note that, US Patent Application Publication No. 2007/0222542 discloses a technique about an electric power transmission system using the magnetic field resonance system as described above.

SUMMARY OF THE INVENTION

Also, in the case of the noncontact electric power feeding system using the magnetic field resonance system described with reference to FIGS. 8 and 9, when the distance between the resonance element 102 of the electric power feeding side 100 and the resonance elements 201 of the electric power receiving side 200 becomes too short, as shown in FIG. 11 as well, the coupling amount becomes small and thus the electric power transmission efficiency is deteriorated.

The reason for this is because when the distance between the resonance element 102 of the electric power feeding side 100, and the resonance element 201 of the electric power receiving side 200 is too short to provide the tight coupling state, the resonance frequency is separated into two parts to provide double-humped resonance characteristics, and thus the electric power transmission efficiency at the central frequency becomes worse.

In other words, in the noncontact electric power feeding system using the magnetic field resonance system and configured as shown in FIG. 8 or 9, when the distance between the electric power feeding side 100 and the electric power receiving side 200 is not property held, a coupling coefficient k between the resonance element 102 and the resonance element 201 is changed to cause the mismatch in the impedance matching.

When the mismatch is caused in the impedance matching in such a manner, there is caused such a problem that since the impedance is reduced, the electric power is reflected, and thus the electric power transmission efficiency becomes worse. For this reason, it is desired that the electric power transmission efficiency is prevented from being reduced even when the tight coupling state is provided between the resonance elements.

The present invention has been made in order to solve the problems described above, and it is therefore desirable to provide noncontact electric power feeding apparatus and method, noncontact electric power receiving apparatus and method, and a noncontact electric power feeding system in each of which even in the case where a distance between an electric power feeding side and an electric power receiving side becomes short to provide a tight coupling state when an electric power is fed or received in a noncontact style by using a resonance system, the electric power transmission efficiency can be highly maintained.

In order to attain the desire described above, according to an embodiment of the present invention, there is provided a noncontact electric power feeding apparatus including: a resonance element for supplying an A.C. electric power in a noncontact style in accordance with a resonance; an A.C. power source portion configured to generate an A.C. electric power to be supplied to the resonance element; and an impedance adjusting section provided between the A.C. power source portion and the resonance element for variably controlling an impedance in accordance with a coupling coefficient between the noncontact electric power feeding apparatus and an electric power feeding destination of the A.C. electric power.

In the noncontact electric power feeding apparatus according to the embodiment of the present invention, the A.C. electric power from the A.C. power source portion is supplied to the resonance element, whereby the magnetic field is generated in the resonance element, and the A.C. electric power is supplied to an electric power receiving apparatus in accordance with the resonance.

Also, the impedance is adjusted so as to be suitable in accordance with the coupling coefficient between the noncontact electric power feeding apparatus and the electric power feeding destination of the A.C. electric power by the impedance adjusting section provided between the A.C. power source and the resonance element.

As a result, the distance between the noncontact electric power feeding apparatus concerned and a noncontact electric power receiving apparatus as the electric power feeding destination of the A.C. electric power is changed, whereby even when the coupling coefficient between the noncontact electric power feeding apparatus and the noncontact electric power receiving apparatus as the electric power feeding destination of the A.C. electric power is changed, the impedance of the resonance element is suitably changed, thereby allowing the noncontact electric power feeding to be carried out at a high efficiency.

Preferably, the impedance adjusting means includes: an adjusting section composed of one of or both of a variable inductor and a variable capacitor; a detecting section configured to detect a magnitude of a reflected electric power which is changed in accordance with the coupling coefficient; and a control section configured to control the adjusting section in accordance with the magnitude of the reflected electric power detected by the detecting section.

In this case, the magnitude of the reflected electric power which is changed in accordance with the coupling coefficient is detected by the detecting section, and the control section is informed of the detection results. Also, the adjusting section composed of one of or both of the variable inductor and the variable capacitor is controlled by the control section, and thus the impedance of the resonance element is properly controlled on a steady basis.

As a result, even when the distance between the noncontact electric power feeding apparatus and the noncontact electric power receiving apparatus as the electric power feeding destination of the A.C. electric power is changed, whereby the coupling coefficient between the noncontact electric power feeding apparatus and the noncontact electric power receiving apparatus as the electric power feeding destination of the A.C. electric power is changed, the impedance of the resonance element is suitably changed, thereby allowing the noncontact electric power feeding to be carried out at the high efficiency.

According to another embodiment of the present invention, there is provided a noncontact electric power receiving apparatus including: a resonance element for receiving an A.C. electric power in a noncontact style in accordance with a resonance from a resonance element of an electric power feeding source; a rectifying circuit for creating a D.C. electric power from the A.C. electric power received through the resonance element to output the D.C. electric power thus created; and an impedance adjusting section provided between the resonance element and the rectifying circuit for variably controlling an impedance in accordance with a magnitude of a coupling coefficient between the noncontact electric power receiving apparatus and the electric power feeding source of the A.C. electric power.

According to still another embodiment of the present invention, there is provided a noncontact electric power feeding method including the step of: variably controlling an impedance in accordance with a coupling coefficient between an A.C. power source portion for generating an A.C. electric power, and an electric power feeding destination of the A.C. electric power between the A.C. power source portion and a resonance element for supplying the A.C. electric power from the A.C. power source portion to another electronic apparatus in a noncontact style.

According to yet another embodiment of the present invention, there is provided a noncontact electric power receiving method including the step of: variably controlling an impedance in accordance with a magnitude of a coupling coefficient between an electric power feeding source of an A.C. electric power and an electric power feeding destination of the A.C. electric power between a resonance element for receiving the A.C. electric power in a noncontact style in accordance with a resonance from a resonance element of the electric power feeding source, and a rectifying circuit for creating a D.C. electric power from the A.C. electric power received through the resonance element to output the D.C. electric power thus created.

According to a further embodiment of the present invention, there is provided a noncontact electric power feeding system including: a noncontact electric power feeding apparatus including: a resonance element for supplying an A.C. electric power in a noncontact style in accordance with a resonance; an A.C. power source portion configured to generate an A.C. electric power to be supplied to the resonance element; and an impedance adjusting section provided between the A.C. power source portion and the resonance element for variably controlling an impedance in accordance with a coupling coefficient between the noncontact electric power feeding apparatus and an electric power feeding destination of the A.C. electric power; and a noncontact electric power receiving apparatus including: a resonance element for receiving the A.C. electric power in a noncontact style in accordance with a resonance of the resonance element of the noncontact element power feeding apparatus; a rectifying circuit for creating a D.C. electric power from the A.C. electric power received through the resonance element to output the D.C. electric power thus created; and an impedance adjusting section provided between the resonance element and the rectifying circuit for variably controlling an impedance in accordance with a magnitude of a coupling coefficient between the noncontact electric power receiving apparatus and the electric power feeding source of the A.C. electric power.

According to the present invention, even in the case where the distance between the electric power feeding side and the electric power receiving side is changed to provide the tight coupling state when the electric power is fed or received in the noncontact style by using the resonance system, the impedance is properly matched, thereby making it possible to highly maintain the transmission efficiency.

DETAILED DESCRIPTION OF THE PREFERRED EMBODIMENTS

Hereinafter, noncontact electric power feeding apparatus and method, noncontact electric power receiving apparatus and method, and a noncontact electric power feeding system according to embodiments of the present invention will be described in detail with reference to the accompanying drawings. Although the present invention can be applied to various kinds of resonance systems such as the magnetic field resonance system, the electric field resonance system, and the electromagnetic resonance system, hereinafter, a description will be given by exemplifying the case where the magnetic field resonance system is used.

[Outline of Noncontact Electric Power Feeding System]

Figure 1:
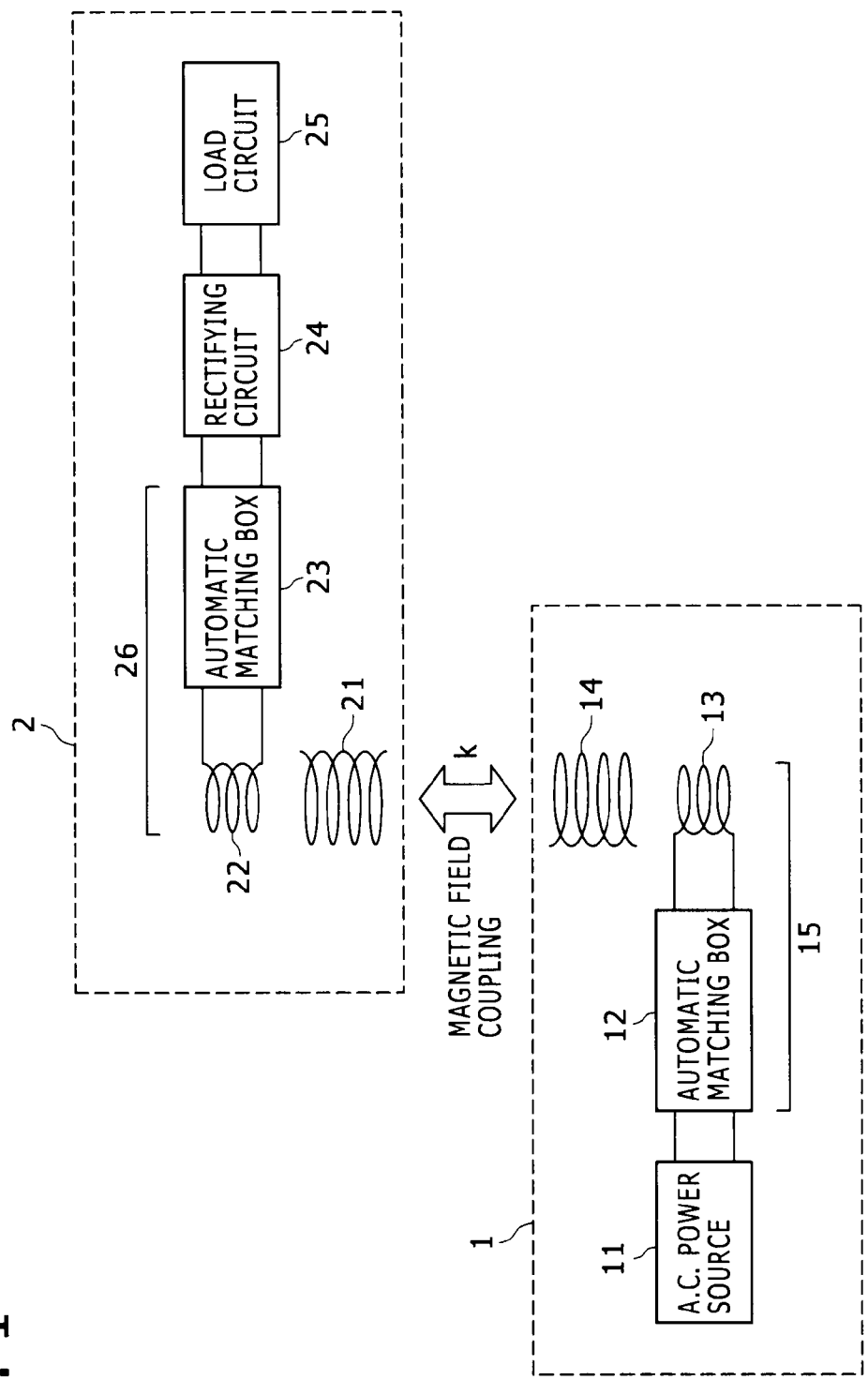
FIG. 1 is block diagram, partly in circuit, showing a configuration of a noncontact electric power feeding system using a magnetic field resonance system according to an embodiment of the present invention.

FIG. 1 is a block diagram, partly in circuit, showing a configuration of the noncontact electric power feeding system using the magnetic field resonance system according to an embodiment of the present invention. The noncontact electric power feeding system using the magnetic field resonance system according to the embodiment of the present invention, as shown in FIG. 1, is composed of an electric power feeding side (electric power feeding source) 1, and an electric power receiving side (electric power feeding destination) 2.

The electric power feeding side 1 feeds the electric power to another electronic apparatus in a noncontact style by using the magnetic field resonance system, and realizes a function as a noncontact electric power feeding apparatus. Specifically, the electric power feeding side 1, for example, is realized in the form of an electronic apparatus such as a charging apparatus (cradle).

In addition, the electric power receiving side 2 receives the electric power from the electric power feeding side 1 in a noncontact style in the embodiment, and uses the electric power for driving of an auto-load circuit, and realizes a function of a noncontact electric power receiving apparatus. Specifically, the electric power receiving side 2 is realized in the form of any, of various kinds of electronic apparatuses, which is required to receive the electric power from the outside in the noncontact style and which is typified by a mobile-phone unit.

The electric power feeding side 1, as shown in FIG. 1, includes an A.C. power source 11, an automatic matching box 12, an excitation element 13, and a resonance element 14 for the electric power feeding. In the embodiment, each of the excitation element 13, and the resonance element 14 for the electric power feeding is constructed in the form of an air core coil.

Also, in the electric power feeding side 1, a function as an impedance converter 15 is realized by the automatic matching box 12 and the excitation element 13. Here, the excitation element 13 obtains the impedance matching between the A.C. power source 11 and the resonance element 14 for the electric power feeding, thereby preventing reflection of the electric power.

In addition, the excitation element 13 realizes a function of highly maintaining a Q value of the resonance element 14 by fixedly setting the impedance of the resonance element 14 for the electric power feeding as a suitable value.

Also, a conversion rate of the impedance using the excitation element 13 is fixed. For this reason, the impedance needs to be controlled so as to match the impedance which is changed in accordance with a coupling coefficient, k, which is changed depending on the transmission distance of the electric power.

Then, although details will also be described later, the automatic matching box 12 realizes a function of variably adjusting an impedance of a resonance circuit having the resonance element 14 for the electric power feeding in accordance with the coupling coefficient, k, which is changed depending on the transmission distance of the electric power. In such a manner, the automatic matching box 12 has the function of variably controlling the impedance conversion rate.

On the other hand, the electric power receiving side 2, as shown in FIG. 1, includes a resonance element 21 for electric power reception, an excitation element 22, an automatic matching box 23, a rectifying circuit 24, and a load circuit 25. In the embodiment, each of the resonance element 21 for electric power reception and the excitation element 22 is constructed in the form of an air core coil.

Also, in the electric power receiving side 2, a function as an impedance converter 26 is realized by the excitation element 22 and the automatic matching box 23. Here, the excitation element 22 obtains the impedance matching between the resonance element 21 for electric power reception and the rectifying circuit 23, thereby preventing the reflection of the electric power.

In addition, the excitation element 22 realizes a function of highly maintaining the Q value of the resonance element 21 for electric power reception by fixedly maintaining the impedance of the resonance element 21.

Also, a conversion rate of the impedance using the excitation element 22 is fixed. For this reason, in the electric power receiving side 2 as well, the impedance needs to be controlled so as to match the impedance which is changed in accordance with the coupling coefficient, k, which is changed depending on the transmission distance of the electric power.

Then, although details will also be described later, the automatic matching box 23 realizes a function of variably adjusting an impedance of a resonance circuit having the resonance element 21 for the electric power reception in accordance with the coupling coefficient, k, which is changed depending on the transmission distance of the electric power. In such a manner, the automatic matching box 23 has the function of variably controlling the impedance conversion rate.

Also, the resonance element 14 of the electric power feeding side 1, and the resonance element 21 of the electric power receiving side 2 are identical in self-resonance frequency to each other, and are coupled to each other through the magnetic field coupling. Also, an input/output impedance between the resonance element 14 and the resonance element 21 depends on the coupling coefficient k between the resonance elements and the Q value of the resonance element. Thus, there is shown a relationship that the input impedance becomes small as both the coupling coefficient k and the Q value are larger.

Also, the A.C. power source 11 of the electric power feeding side 1 generates an A.C. electric power (A.C. current) having the same frequency or approximately the same frequency as the self-resonance frequency of the resonance element 14 of the electric power feeding side 1, and supplies the A.C. electric power thus generated to the excitation element 13 through the automatic matching box 12. For the purpose of generating the A.C. electric power having the desired frequency, the A.C. power source 11 of the electric power feeding side 1, for example, includes a Colpitts oscillating circuit, a Hartley oscillating circuit or the like.

The excitation element 13 of the electric power feeding side 1 is an element which is excited by the A.C. electric power supplied thereto from the A.C. power source 11, thereby supplying the A.C. electric power therefrom to the resonance element 14 for the electric power feeding. The excitation element 13 which receives the A.C. electric power supplied thereto from the A.C. power source 11, and the resonance element 14 for the electric power feeding are strongly coupled to each other through the electromagnetic induction. To this end, the A.C. electric power from the A.C. power source 11 is supplied to the resonance element 14 for the electric power feeding through the excitation element 13.

Also, the resonance element 14 for the electric power feeding generates the magnetic field in accordance with the A.C. electric power supplied thereto from the excitation element 13. The resonance element 14 for the electric power feeding includes an inductor L and a capacitor C. The strength of the magnetic field of the resonance element 14 for the electric power feeding becomes highest at a resonance frequency.

That is to say, a resonance frequency $f_n$ of the resonance element 14 for the electric power feeding is expressed by Expression (1):

$$f_{01} = \frac{1}{2\pi\sqrt{L_1 C_1}} \quad (1)$$

where $L_1$ is an inductance which the resonance element 14 for the electric power feeding has, and $C_1$ is a capacitance which the resonance element 14 for the electric power feeding has.

Therefore, the resonance frequency $f_{01}$ of the resonance element 14 for the electric power feeding depends on the inductance $L_1$ and the capacitance $C_1$ each of which the resonance element 14 for the electric power feeding has. As described above, since the resonance element 14 for the electric power feeding is constructed in the form of the air core coil, a line capacitor of the resonance element 14 for the electric power feeding plays a part of the capacitor. Also, the resonance element 14 for the electric power feeding generates the magnetic field in an axial direction of the coil.

On the other hand, the resonance element 21 for the electric power reception of the electric power receiving side 2 is an element which receives the A.C. electric power supplied thereto from the electric power feeding side 1 in accordance with the magnetic field coupling based on the magnetic field resonance. A resonance frequency $f_{02}$ of the resonance element 21 for the electric power reception of the electric power receiving side 2 is expressed by Expression (2):

$$f_{02} = \frac{1}{2\pi\sqrt{L_2 C_2}} \quad (2)$$

where $L_2$ is an inductance which the resonance element 21 for the electric power reception has, and $C_2$ is a capacitance which the resonance element 21 for the electric power reception has. In this case, the resonance element 21 for the electric power reception has the same resonance frequency or approximately the same resonance frequency as that of the resonance element 14 for the electric power feeding of the electric power feeding side 1.

Also, as described above, since the resonance element 21 for the electric power reception of the electric power receiving side 2 is constructed in the form of the air core coil, a line capacitor plays a part of a capacitor. Also, as shown in FIG. 1, the resonance element 21 for the electric power reception of the electric power receiving side 2 is coupled to the resonance element 14 for the electric power feeding of the electric power feeding side 1 through the magnetic field resonance.

As a result, the A.C. electric power is supplied from the resonance element 14 for the electric power feeding of the electric power feeding side 1 to the resonance element 21 for the electric power reception of the electric power receiving side 2 at the resonance frequency in the noncontact style through the magnetic field resonance.

Also, as described above, in the electric power receiving side 2, the resonance element 21 for the electric power reception and the excitation element 22 are coupled to each other through the electromagnetic induction. Thus, the A.C. electric power is supplied from the resonance element 21 for the electric power reception to the rectifying circuit 24 through the excitation element 22 and the automatic matching box 23.

The rectifying circuit 24 creates a D.C. electric power which will be supplied to the load circuit 25 in a subsequent stage from the A.C. electric power supplied thereto through the excitation element 22 and the automatic matching box 23, and then supplies the D.C. electric power thus created to the load circuit 25. The load circuit 25, for example, is any of various kinds of circuit portions such as a charging circuit having a battery.

In such a manner, in the noncontact electric power feeding system using the magnetic field resonance system of the embodiment, the electric power can be fed from the electric power feeding side 1 to the electric power receiving side 2 in the noncontact style.

Also, as also described above, in the electric power feeding side 1, by using the excitation element 13, the reflection of the electric power is prevented, the Q value is highly maintained by suitably holding the impedance of the resonance circuit having the resonance element 14 for the electric power feeding, and the transmission efficiency of the electric power is held at the high efficiency.

Likewise, in the electric power receiving side 2 as well, by using the excitation element 22, the reflection of the electric power is prevented, the Q value is highly maintained by suitably holding the impedance of the resonance circuit having the resonance element 21 for the electric power reception, and the transmission efficiency of the electric power is held at the high efficiency.

However, although details will also be described later, when the electric power feeding side 1 and the electric power receiving side 2 come close to each other, so that the tight coupling state is provided between the resonance element 14 for the electric power feeding, and the resonance element 21 for the electric power reception, the resonance frequency is separated into two parts to provide the double-humped resonance characteristics. As a result, the transmission efficiency at the resonance frequency becomes worse.

The reason for this is because if the transmission distance between the resonance element 14 for the electric power feeding and the resonance element 21 for the electric power reception is changed, the coupling coefficient k between the resonance element 14 for the electric power feeding, and the resonance element 21 for the electric power reception would also be changed, whereby the impedance mismatch is caused in the input/output in the noncontact electric power feeding system, and thus the transmission efficiency is reduced.

In order to cope with such a situation, in the electric power feeding side 1, the automatic matching box 12 can adjust adaptively the impedance in accordance with the coupling coefficient k which is changed depending on the transmission distance. Likewise, in the electric power receiving side 2 as well, the automatic matching box 23 can adjust adaptively the impedance in accordance with the coupling coefficient k which is changed depending on the transmission distance.

[Method of Adjusting Impedance]

The resonance element 14 for the electric power feeding of the electric power feeding side 1, and the resonance element 21 for the electric power reception of the electric power receiving side 2 are identical in self-resonance frequency to each other, and are coupled to each other through the magnetic field coupling. Also, the transmission efficiency between the resonance element 14 for the electric power feeding and the resonance element 21 for the electric power reception depends on both the coupling coefficient k between the resonance element 14 for the electric power feeding and the resonance element 21 for the electric power reception, and the Q values of the resonance element 14 for the electric power feeding and the resonance element 21 for the electric power reception. Thus, the transmission efficiency of the electric power becomes high as both the coupling coefficient k and the Q value are larger.

In addition, the coupling coefficient k depends on the distance between the resonance elements, and each of the sizes of the resonance elements. Thus, the coupling becomes strong and the high efficiency is obtained as each of the sizes of the resonance elements is larger and the distance between the resonance elements is shorter. However, it can be said that since each of the sizes of the resonance elements is fixed, the coupling coefficient k is changed in accordance with the distance between the resonance elements.

Then, as also described above, in the automatic matching box 12 of the electric power feeding side 1, the impedance of the resonance circuit having the resonance element 14 for the electric power feeding can be adjusted in accordance with the coupling coefficient k between the electric power feeding side 1 and the electric power receiving side 2.

Likewise, in the automatic matching box 23 of the electric power receiving side 2, the impedance of the resonance circuit having the resonance element 21 for the electric power reception can be adjusted in accordance with the coupling coefficient k between the electric power feeding side 1 and the electric power receiving side 2.

Here, it is concretely described that the impedance of the resonance circuit having the resonance element 14 for the electric power feeding of the electric power feeding side 1, and the impedance of the resonance circuit having the resonance element 21 for the electric power reception of the electric power receiving side 2 can be both adjusted in accordance with the coupling coefficient k between the electric power feeding side 1 and the electric power receiving side 2.

Figure 2:
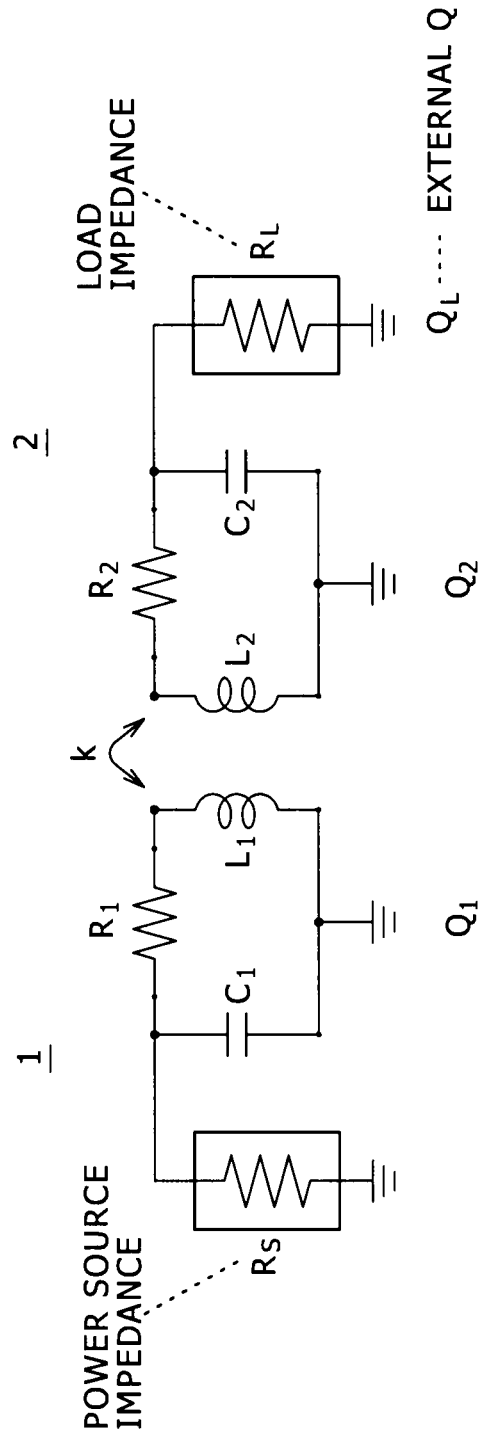
FIG. 2 is an equivalent circuit diagram of the noncontact electric power feeding system having a basic configuration.
Figure 8:
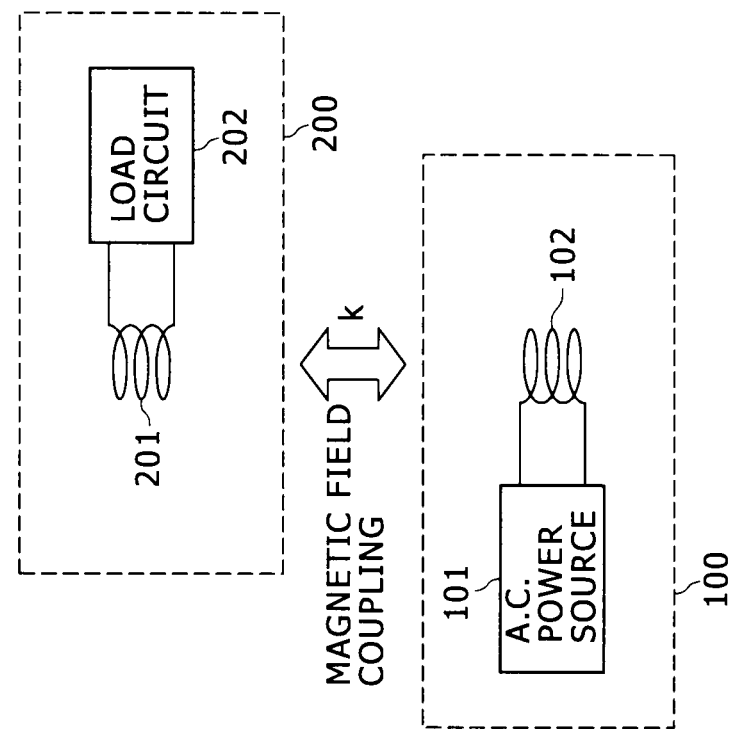
FIG. 8 is a conceptual diagram, partly in circuit, showing a basic configuration of the noncontact electric power feeding system using the magnetic field resonance system shown in FIG. 1.
Figure 9:
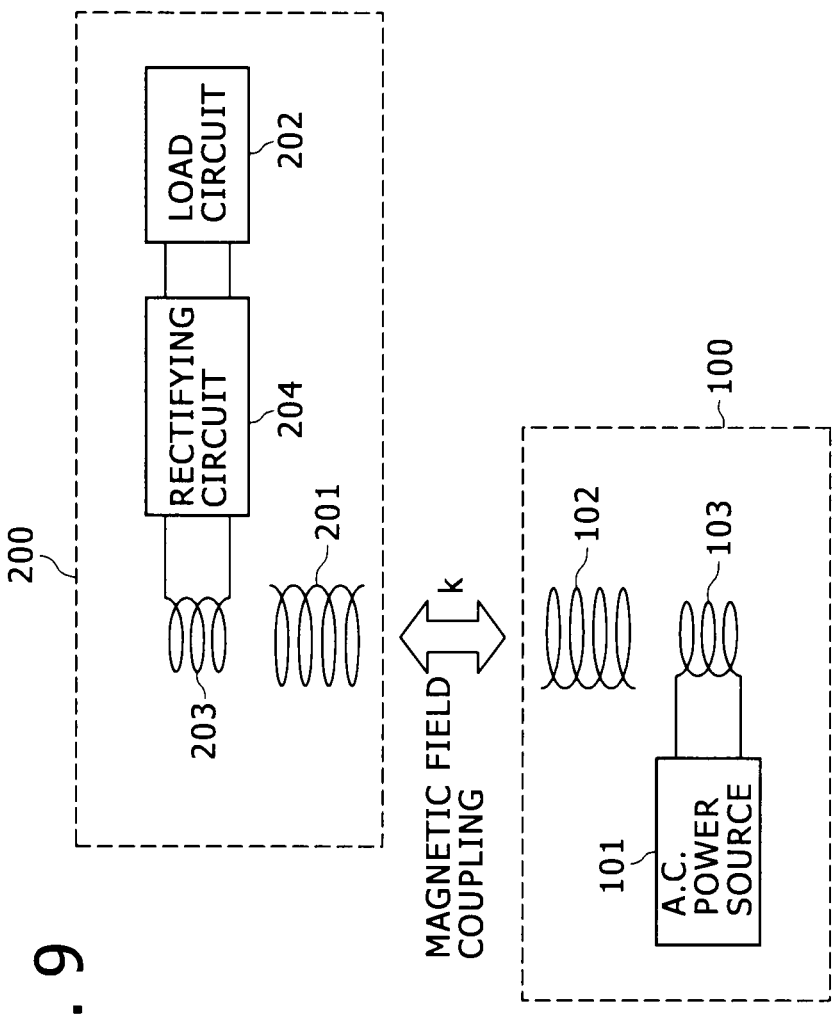
FIG. 9 is a block diagram, partly in circuit, showing a configuration of the noncontact electric power feeding system using the magnetic field resonance system and provided with an excitation element.
Figure 10:
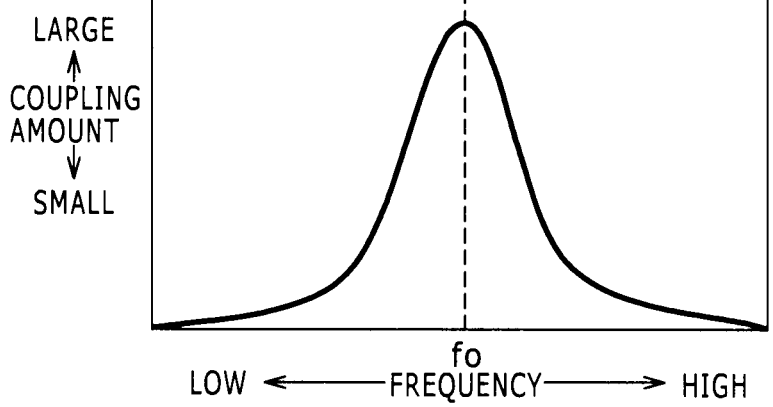
FIG. 10 is a graphical representation explaining frequency characteristics in the noncontact electric power feeding system using the magnetic field resonance system.
Figure 11:
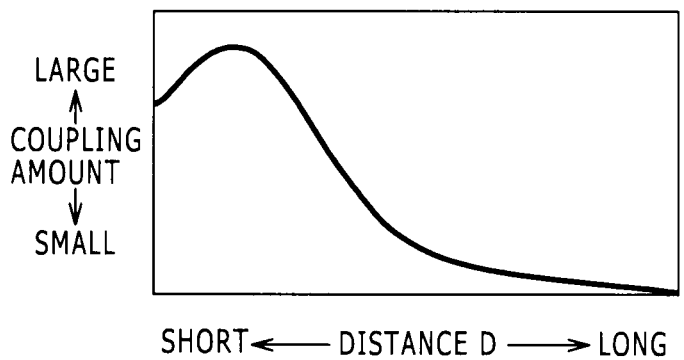
FIG. 11 is a graphical representation explaining a relationship between a distance between the resonance elements, and a coupling amount in the noncontact electric power feeding system using the magnetic field resonance system.
Figure 12:
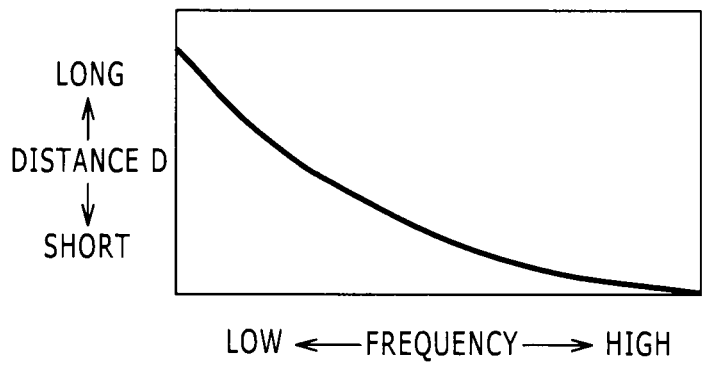
FIG. 12 is a graphical representation explaining a relationship between a resonance frequency and the distance between the resonance elements in which a maximum coupling amount is obtained in the noncontact electric power feeding system using the magnetic field resonance system.

FIG. 2 is an equivalent circuit diagram of the noncontact electric power feeding system having the basic configuration in which the electric power feeding side 1 is composed of the A.C. power source 11 and the resonance element 14 for the electric power feeding, and the electric power receiving side 2 is composed of the resonance element 21 for the electric power reception, and the load circuit 25 similarly to the case of the noncontact electric power feeding system using the magnetic field resonance system shown in FIG. 8.

As shown in FIG. 2, the A.C. power source 11 of the electric power feeding side 1 can be equivalently expressed in the form of an A.C. power source having an impedance $R_s$. In addition, the resonance element 14 for the electric power feeding of the electric power feeding side 1 can be equivalently expressed in the form of a resonance circuit having an inductor $L_1$, a capacitor $C_1$, and a resistor $R_1$.

In addition, the resonance element 21 of the electric power receiving side 2 can be equivalently expressed in the form of a resonance circuit having an inductor $L_2$, a capacitor $C_2$, and a resistor $R_2$. Also, the load circuit 25 of the electric power receiving side 2 can be equivalently expressed in the form of a load having an impedance $R_L$.

Also, in the equivalent circuit shown in FIG. 2, the resonance frequency $f_{01}$ of the resonance element 14 for the electric power feeding of the electric power feeding side 1 can be expressed by Expression (1) described above. In addition, the resonance frequency $f_{02}$ of the resonance element 21 for the electric power reception of the electric power reception side 2 can be expressed by Expression (2) described above.

In addition, in the equivalent circuit shown in FIG. 2, a Q value ($Q_1$) of the resonance element 14 for the electric power feeding of the electric power feeding side 1 can be expressed by Expression (3):

$$Q_1 = \frac{1}{R_1}\sqrt{\frac{L_1}{C_1}} \qquad (3)$$

In addition, a Q value ($Q_2$) of the resonance element 21 for the electric power reception of the electric power receiving side 2 can be expressed by Expression (4):

$$Q_2 = \frac{1}{R_2}\sqrt{\frac{L_2}{C_2}} \qquad (4)$$

In addition a Q value ($Q_L$) of the load circuit 25 of the electric power receiving side 2 can be expressed by Expression (5):

$$Q_L = R_L\sqrt{\frac{C_2}{L_2}} \qquad (5)$$

Here, the coupling coefficient between the resonance element 14 for the electric power feeding of the electric power feeding side 1, and the resonance element 21 for the electric power reception of the electric power reception side 2 is designated by reference symbol k. In addition, a Q value of the circuit composed of the resonance element (resonance circuit) 14 and the resonance element (resonance circuit) 21 is designated by reference symbol Q. Also, a multiplication value (k×Q) of the coupling coefficient k and the Q value is expressed by reference symbol S.

In a word, S=k×Q is set. In this case, the maximum transmission efficiency $\eta_{MAX}$ is expressed by Expression (6):

$$\eta_{max} = \frac{(1+S^2)^{\frac{1}{2}}S^2}{\left[\left(1+(1+S^2)^{\frac{1}{2}}\right)S^2\right]+\left[\left(1+(1+S^2)^{\frac{1}{2}}\right)^2\right]} \qquad (6)$$

As can be seen from Expression (6), the maximum transmission efficiency $\eta_{MAX}$ is expressed as a function of S (=k× Q).

Figure 3:
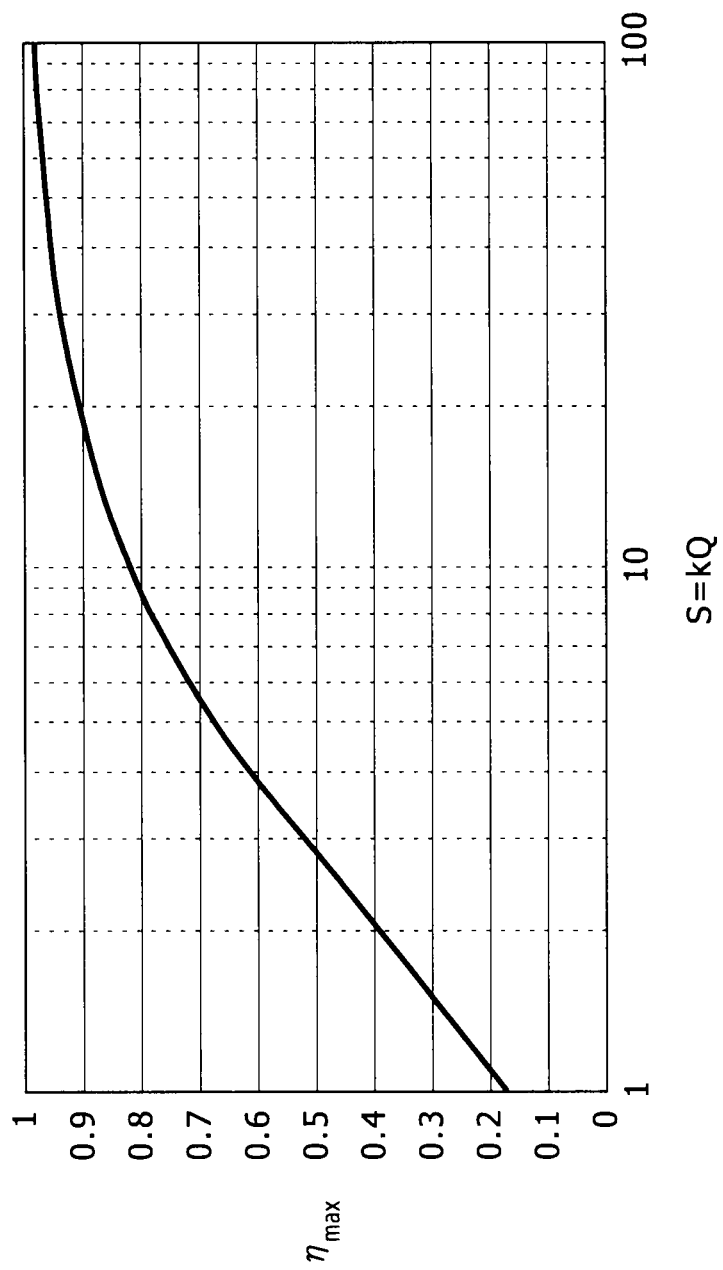
FIG. 3 is a graph showing a relationship between a maximum transmission efficiency $\eta_{MAX}$ and a value S (=k×4)

FIG. 3 is a graph showing a relationship between the maximum transmission efficiency $\eta_{MAX}$ expressed by Expression (6), and the value S (=k×Q). As can be seen from FIG. 3, it is understood that when the value S becomes larger than 20 (when S>20), the maximum transmission efficiency $\eta_{MAX}$ becomes equal to or larger than 90%. That is to say, it is understood that the transmission efficiency depends on the coupling efficiency k.

Also, when the maximum transmission efficiency $\eta_{MAX}$ is equal to or larger than 90%, the input/output impedance $R_S$ in the electric power feeding side 1, and the output/output impedance $R_L$ in the electric power receiving side 2 match each other. Thus, the input/output impedance $R_L$ at this time is expressed by Expression (7):

$$R_L = \frac{1}{\sqrt{1+S^2}}\frac{L_2}{R_2C_2} \qquad (7)$$

As can be seen from Expression (7), the input/impedance $R_L$ becomes a function of S (=k×Q). Therefore, it is also understood that when the coupling coefficient k, is changed, the input/output impedance $R_L$ is also changed accordingly.

Here, when $L_1=L_2=1$ (μH), $C_1=C_2=1$ (pF), and $R_1=R_2=10$ (Ω) are set in the equivalent circuit shown in FIG. 2, the Q value $Q_1$ of the resonance element 14 for the electric power feeding, and the Q value $Q_2$ of the resonance element 21 for the electric power reception are expressed by $Q_1=Q_2=100$, and the resonance frequency $f_{01}$ of the resonance element 14 for the electric power feeding, and the resonance frequency $f_{02}$ of the resonance element 21 for the electric power reception are expressed by $f_{01}=f_{02}=159.23$ (MHz).

Figure 4:
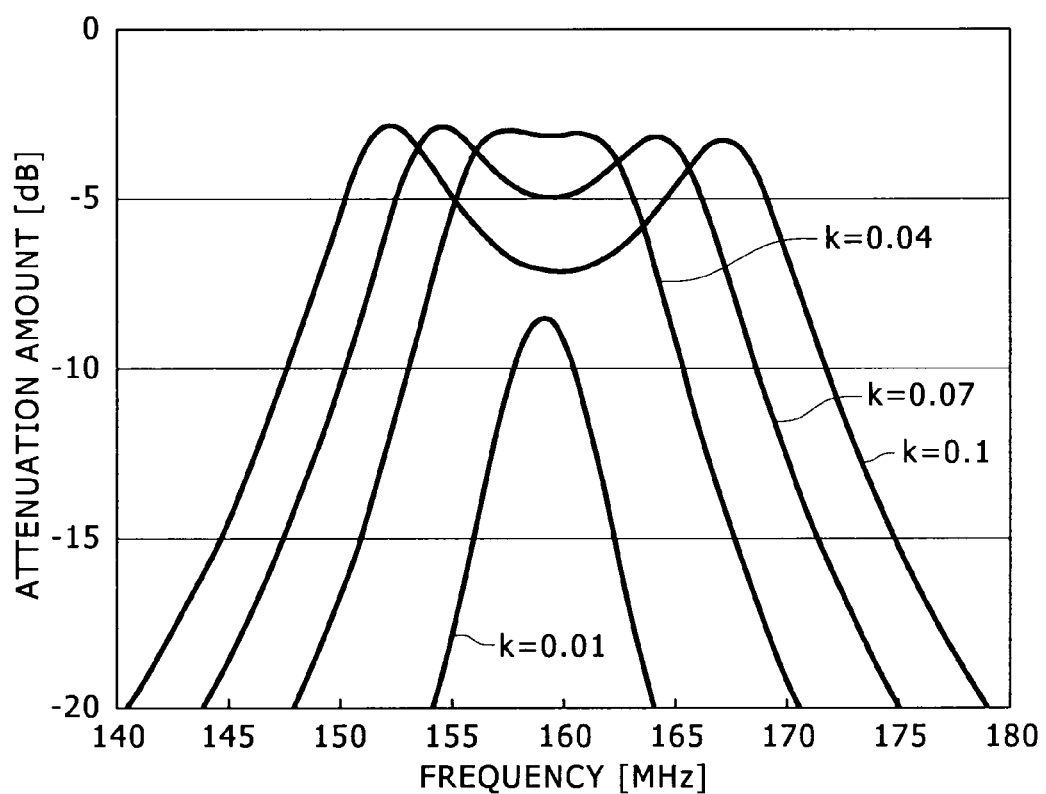
FIG. 4 is a graph showing transmission characteristics of an electric power when a coupling coefficient is changed.

FIG. 4 shows transmission characteristics in the case where when this state is held, each of the power source impedance $R_S$ and the load impedance $R_L$ is fixed to 3,000 (Ω), and the coupling coefficient, k, is changed to 0.01, 0.04, 0.07, and 0.21 in order.

As can be seen from FIG. 4, it is understood that when the coupling coefficient k becomes large to provide the tight coupling state, the transmission characteristics becomes the double-humped resonance characteristics, and an attenuation amount becomes large at the central frequency, and thus the transmission efficiency of the electric power is reduced.

Figure 5:
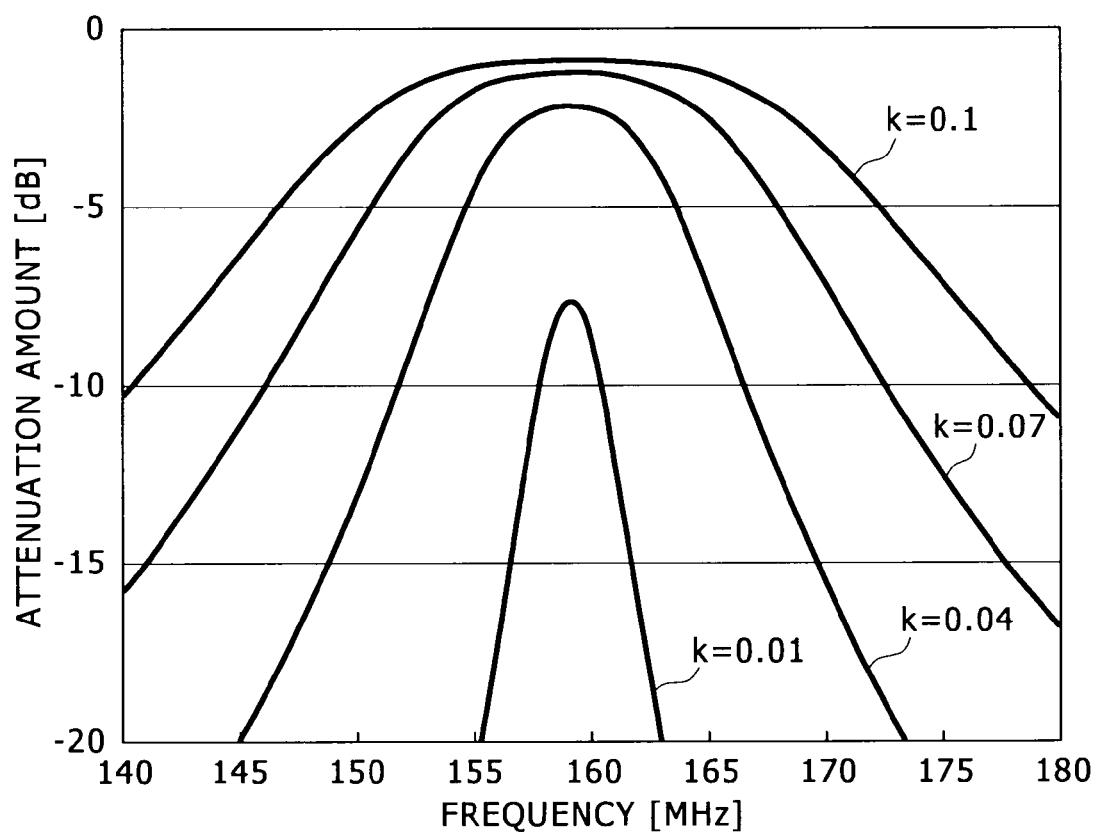
FIG. 5 is a graph showing transmission characteristics of an electric power when the coupling coefficient is changed, and values of a power source impedance and a load impedance are changed.

FIG. 5 shows the transmission characteristics of the electric power when in order to cope with such a situation, the coupling coefficient k is changed to 0.01, 0.04, 0.07, and 0.1 in order in the manner as described above, and each of the power source impedance $R_S$ and the load impedance $R_L$ is made variable in accordance with Expression (7).

As can be seen from FIG. 5, it is understood that even when the coupling coefficient k becomes large to provide the tight coupling state, the double-humped resonance characteristics are prevented from being provided by adjusting the impedance, and thus the transmission efficiency of the electric power is not reduced even at the central frequency.

Actually, each of the power source impedance $R_S$ and the load impedance $R_L$ is fixed. To this end, as previously with reference to FIG. 1, in the noncontact electric power feeding system of the embodiment, the electric power feeding side 1 is provided with the automatic matching box 12 for the impedance adjustment and the electric power receiving side 2 is provided with the automatic matching box 23 for the impedance adjustment.

Also, as also described above, in the automatic matching box 12 of the electric power feeding side 1, the Q value of the resonance element 14 for the electric power feeding is highly maintained by adjusting the impedance of the electric power feeding side 1 in accordance with the magnitude of the coupling coefficient k and thus the transmission efficiency of the electric power is highly held.

Likewise, in the automatic matching box 23 of the electric power receiving side 2, the Q value of the resonance element 21 for the electric power reception is highly maintained by adjusting the impedance of the electric power receiving side 2 in accordance with the magnitude of the coupling coefficient k and thus the transmission efficiency of the electric power is highly held.

As a result, in the noncontact electric power feeding system shown in FIG. 1, the impedances of the electric power feeding side 1 and the electric power receiving side 2 are suitably controlled in accordance with the magnitude of the coupling coefficient, k. Thus, as shown in FIG. 5, the transmission efficiency of the electric power is prevented from being reduced even at the central frequency on a steady basis.

[Configurations of Automatic Matching Boxes 12 and 23]

Next, a description will be given with respect to concrete configurations of the automatic matching box 12 of the electric power feeding side 1, and the automatic matching box 23 of the electric power receiving side 2. As previously stated, when the distance between the resonance element 14 for the electric power feeding, and the resonance element 21 for the electric power reception becomes short to provide the tight coupling state, the impedance in the electric power feeding side 1 and the impedance in the electric power receiving side 2 are both reduced to lower the transmission efficiency of the electric power.

Also, the reduction of the impedance means that the reflected electric power is increased. Thus, the reflected electric power is detected instead of directly detecting the change of the coupling coefficient k and the impedance is directly adjusted so that the reflected electric power disappears.

Figure 6:
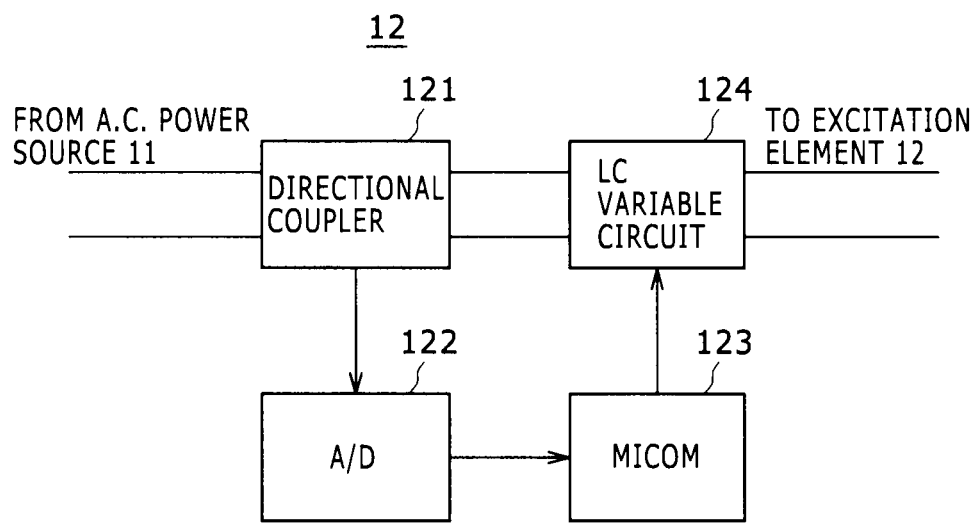
FIG. 6 is a block diagram showing a configuration of an automatic matching box of an electric power feeding side in the noncontact electric power feeding system using the magnetic field resonance system shown in FIG. 1.

Firstly, a description will be given with respect to a configuration of the automatic matching box 12 of the electric power feeding side 1. FIG. 6 is a block diagram showing the configuration of the automatic matching box 12 of the electric power feeding side 1. As shown in FIG. 6, the automatic matching box 12 of the electric power feeding side 1 is composed of a directional coupler 121, an Analog/Digital (A/D) conversion circuit 122, a microcomputer (hereinafter referred to as "a micom" for short) 123, and an LC variable circuit 124.

The directional coupler 121 is a device of three ports (unidirectional coupler) in the case of FIG. 6. Thus, the directional coupler 121 detects the reflected electric power which is changed in accordance with the coupling coefficient k as described above, and supplies the reflected electric power thus detected to the A/D converter 122.

The A/D converter 122 converts the reflected electric power supplied thereto from the directional coupler 121 into a digital signal and supplies the resulting digital signal to the micom 123. The micom 123 produces a control signal in accordance with which the LC variable circuit 124 is controlled based on the magnitude of the reflected electric power from the A/D converter 122, and supplies the control signal thus produced to the LC variable circuit 124.

The LC variable circuit 124 includes a variable inductor and a variable capacitor in the case of the automatic matching box 12 shown in FIG. 6. The LC variable circuit 124 controls both the variable inductor and the variable capacitor in accordance with the control signal supplied thereto from the micom 123, thereby adjusting the impedance of the electric power feeding side 1.

In this case, the inductance value of the variable inductor, and the capacitance value of the variable capacitor are adjusted to adjust the impedance of the electric power feeding side 1, thereby preventing the double-humped resonance characteristics from being provided as previously described with reference to FIG. 5. As a result, it is possible to prevent the deterioration of the transmission efficiency in the phase of the tight coupling.

In a word, when the magnitude of the reflected electric power is large, the inductance value of the variable inductor, and the capacitance value of the variable capacitor in the LC variable circuit 124 are adjusted so as to reduce the magnitude of the reflected electric power to zero. As a result, the inductance value of the inductor in the resonance circuit of the electric power feeding side 1 is preferably adjusted. As a result, the double-humped resonance characteristics are avoided on the electric power feeding side 1, thereby preventing the transfer characteristics of the electric power from being deteriorated at the central frequency.

Next, a description will be given with respect to the configuration of the automatic matching box 23 of the electric power receiving side 2. The automatic matching box 23 of the electric power receiving side 2 is also basically configured similarly to the case of the automatic matching box 12 of the electric power feeding side 1 shown in FIG. 6.

Figure 7:
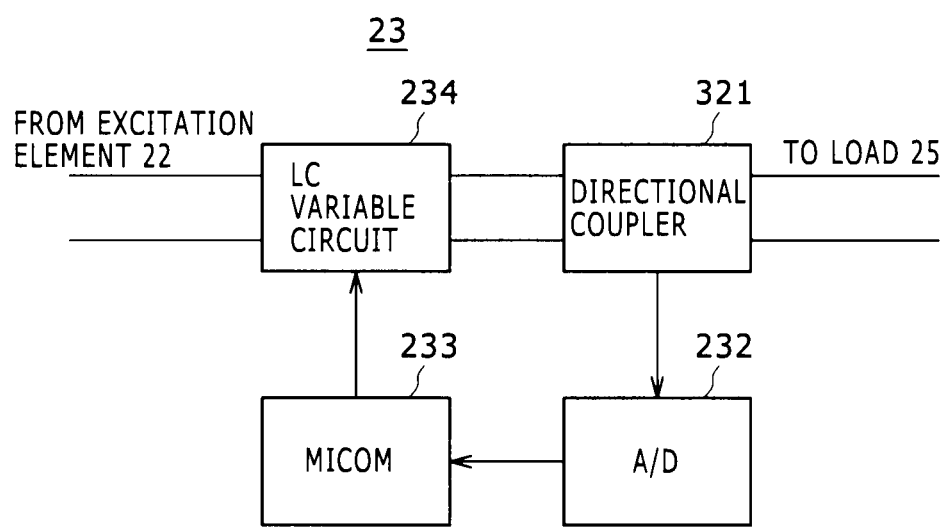
FIG. 7 is a block diagram showing a configuration of an automatic matching box of an electric power receiving side in the noncontact electric power feeding system using the magnetic field resonance system shown in FIG. 1.

FIG. 7 is a block diagram showing the configuration of the automatic matching box 23 of the electric power receiving side 2. As shown in FIG. 7, the automatic matching box 23 of the electric power receiving side 2 is composed of a directional coupler 231, an A/D converter 232, a micom 233, and an LC variable circuit 234.

The directional coupler 231 is a device of three ports (unidirectional coupler) similarly to the case of the directional coupler 121 of the electric power feeding side 1 described above. Thus, the directional coupler 231 detects the reflected electric power which is changed in accordance with the coupling coefficient k and supplies the reflected electric power thus detected to the A/D converter 232.

The A/D converter 232 converts the reflected electric power supplied thereto from the directional coupler 231 into a digital signal and supplies the resulting digital signal to the micom 233. The micom 233 produces a control signal in accordance with which the LC variable circuit 234 is controlled based on the magnitude of the reflected electric power from the A/D converter 232, and supplies the control signal thus produced to the LC variable circuit 234.

The LC variable circuit 234 includes a variable inductor and a variable capacitor similarly to the case of the LC variable circuit 124 of the electric power feeding side 1. The LC variable circuit 234 controls both the variable inductor and the variable capacitor in accordance with the control signal supplied thereto from the micom 233, thereby adjusting the impedance of the electric power receiving side 2.

In this case, the inductance value of the variable inductor, and the capacitance value of the variable capacitor are adjusted to adjust the impedance of the electric power feeding side 1, thereby preventing the double-humped resonance characteristics from being provided as previously described with reference to FIG. 5. As a result, it is possible to prevent the deterioration of the transmission efficiency in the phase of the tight coupling.

In a word, when the magnitude of the reflected electric power is large, the inductance value of the variable inductor, and the capacitance value of the variable capacitor in the LC variable circuit 234 are adjusted so as to reduce the magnitude of the reflected electric power to zero. As a result, the inductance value of the inductor in the resonance circuit of the electric power receiving side 2 is properly adjusted. As a result, the double-humped resonance characteristics are avoided on the electric power receiving side 2 as well, thereby preventing the transfer characteristics of the electric power from being deteriorated at the central frequency.

The automatic matching box 12 shown in FIG. 6, and the automatic matching box 23 shown in FIG. 7 are both used, whereby the impedance matching can be suitably carried out in each of the electric power feeding side 1 and the electric power receiving side 2.

It is noted that each of the automatic matching boxes 12 and 23 can be realized in the form of either a low-pass filter or a high-pass filter which is composed of an L type circuit (L match), a T type circuit (T match) or a Π type circuit (Π match).

In addition, the LC variable circuit 124 is used in the automatic matching box 12 shown in FIG. 6. However, the present invention is by no means limited thereto. That is to say, an adjusting circuit using one of the variable inductor and the variable capacitor may be used in the automatic matching box 12 instead of using the LC variable circuit 124 as long as the impedance of the resonance circuit can be suitably adjusted.

In addition, the LC variable circuit 234 is used in the automatic matching box 23 shown in FIG. 7. However, the present invention is by no means limited thereto. That is to say, an adjusting circuit using one of the variable inductor and the variable capacitor may be used in the automatic matching box 23 instead of using the LC variable circuit 234 as long as the impedance of the resonance circuit can be suitably adjusted.

[Changes]

It is noted that as also stated above, it has been described that the maximum transmission efficiency $\eta_{MAX}$ is expressed as the function of S ($=k \times Q$). Also, it can also be said that the maximum transmission efficiency $\eta_{MAX}$ depends on the Q values of the resonance element 14 for the electric power feeding, and the resonance element 21 for the electric power reception because of the expression of $S = k \times Q$.

For this reason, of cause, there may be adopted a configuration such that the LC variable circuits 124 and 234 are controlled in accordance with the Q values obtained in accordance with Expressions (3) and (4), and the impedance of the electric power feeding side 1, and the impedance of the electric power receiving side 2 are controlled so that the Q values become the predetermined values, respectively.

In addition, in the electric power receiving side 2, for example, on the basis of the magnitude of the A.C. electric power in a preceding stage of the rectifying circuit 24 or the magnitude of the D.C. electric power in a subsequent stage of the rectifying circuit 24, the impedance of the electric power receiving side 2 may be adjusted so that the magnitudes of the A.C. electric power and the D.C. electric power become the predetermined magnitudes, respectively.

For example, in the automatic matching box 24 shown in FIG. 7, a detector for detecting the magnitude of the A.C. electric power is provided in the preceding stage of the rectifying circuit 24 instead of using the directional coupler 231. Also, a detection output from the detector is fed back to the A/D converter 232 of the automatic matching box 23.

It is also possible to adopt a configuration such that the A/D converter 232 converts the magnitude of the A.C. electric power into a digital signal, and supplies the resulting digital signal to the micom 233, and the micom 233 adjusts the impedance by controlling the LC variable circuit 234, thereby adjusting the magnitude of the A.C. electric power to the desired magnitude.

Likewise, in the automatic matching box 24 shown in FIG. 7, a detector for detecting the magnitude of the D.C. electric power is provided in the subsequent stage of the rectifying circuit 24 instead of using the directional coupler 231. Also, a detection output from the detector is fed back to the A/D converter 232 of the automatic matching box 23.

It is also possible to adopt a configuration such that the A/D converter 232 converts the magnitude of the D.C. electric power into a digital signal, and supplies the resulting digital signal to the micom 233, and the micom 233 adjusts the impedance by controlling the LC variable circuit 234, thereby adjusting the magnitude of the D.C. electric power to the desired magnitude.

EFFECTS OF THE EMBODIMENT

Even when the transmission distance is changed and thus the coupling coefficient k is changed, the matching is obtained between the input/output impedances, thereby making it possible to enhance the transmission efficiency. In addition, even in the case of the tight coupling state, it is possible to prevent the reduction of the transmission efficiency at the central frequency.

In addition, in the tight coupling state, the double-humped resonance characteristics are not provided, but the single peak resonance characteristics can be provided, and thus the transmission characteristics can be made to have the boarder band. Therefore, even when the electric power is not fed or received, but the communication is carried out, the present invention can be applied thereto, and thus the data can be precisely transmitted at a high speed even in a near distance.

It is noted that as shown in FIG. 1, the noncontact electric power feeding system composed of the electric power feeding side (noncontact electric power feeding apparatus) 1, and the electric power receiving side (noncontact electric power receiving apparatus) 2 is configured in accordance with the application of the noncontact electric power feeding system according to an embodiment of the present invention.

[Noncontact Electric Power Feeding Apparatus]

The noncontact electric power feeding apparatus according to another embodiment of the present invention includes: the resonance element 14 for supplying the A.C. electric power in the noncontact style in accordance with the resonance; the A.C. power source 11 for generating the A.C. electric power to be supplied to the resonance element; and the automatic matching box 12 provided between the A.C. power source 11 and the resonance element 14 for variably controlling the impedance in accordance with the coupling coefficient, k, between the noncontact electric power feeding apparatus and the electric power receiving side 2 of the A.C. electric power.

[Noncontact Electric Power Receiving Apparatus]

The noncontact electric power receiving apparatus according to still another embodiment of the present invention includes: the resonance element 21 for receiving the A.C. electric power in the noncontact style in accordance with the resonance from the resonance element 14 of the electric power feeding side 1; the rectifying circuit 24 for creating the D.C. electric power from the A.C. electric power received through the resonance element 21 to output the D.C. electric power thus created; and the automatic matching box 23 provided between the resonance element 21 and the rectifying circuit 24 for variably controlling the impedance in accordance with the magnitude of the coupling coefficient, k, between the electric power receiving side 2 and the electric power feeding side 1 of the A.C. electric power.

[Noncontact Electric Power Feeding Method]

The electric power feeding method in the electric power feeding side 1 described with reference to FIGS. 1 to 6 is a noncontact electric power feeding method of the present invention. That is to say, the noncontact electric power feeding method according to yet another embodiment of the present invention includes the step of: variably controlling the impedance in accordance with the coupling coefficient k between the A.C. power source 11 for generating the A.C. electric power, and the electric power receiving side 2 of the A.C. electric power between the A.C. power source 11 and the resonance element 14 for supplying the A.C. electric power from the A.C. power source 11 to another electronic apparatus in the noncontact style. The noncontact electric power feeding method according to the yet another embodiment of the present invention is realized in the apparatus having the configuration shown in FIGS. 1 and 6.

[Noncontact Electric Power Receiving Method]

Likewise, the electric power receiving method in the electric power receiving side 2 described with reference to FIGS. 1 to 5 and FIG. 7 is a noncontact electric power receiving method of the present invention. That is to say, the noncontact electric power receiving method according to a further embodiment of the present invention includes the step of: variably controlling the impedance in accordance with the magnitude of the coupling coefficient k between the electric power feeding side 1 of the A.C. electric power and the electric power receiving side 2 of the A.C. electric power between the resonance element 21 for receiving the A.C. electric power in the noncontact style in accordance with the resonance from the resonance element 14 of the electric power feeding side 1, and the rectifying circuit 24 for creating the D.C. electric power from the A.C. electric power received through the resonance element 21 to output the D.C. electric power thus created. The noncontact electric power receiving method according to the further embodiment of the present invention is realized in the apparatus having the configuration shown in FIGS. 1 and 7.

[Others]

It is noted that in the embodiments described above, the resonance element 14 for the electric power feeding of the electric power feeding side 1 shown in FIG. 1 realizes the function as the resonance element in the noncontact electric power feeding apparatus in the another embodiment of the present invention. In addition, the A.C. power source 11 of the electric power feeding side 1 shown in FIG. 1 realizes the A.C. power source portion in the noncontact electric power feeding apparatus in the another embodiment of the present invention. Also, the automatic matching box 12 of the electric power feeding side 1 realizes the impedance adjusting means in the noncontact electric power feeding apparatus in the another embodiment of the present invention.

In addition, the LC variable circuit 124 shown in FIG. 6 realizes the adjusting means, the directional coupler 121 shown in FIG. 6 realizes the detecting means and the micom 123 shown in FIG. 6 realizes the control means.

In addition, the resonance element 21 for the electric power reception of the electric power receiving side 2 shown in FIG. 1 realizes the function as the resonance element in the noncontact electric power receiving apparatus in the still another embodiment of the present invention, and the rectifying circuit 24 of the electric power receiving side 2 realizes the rectifying circuit in the noncontact electric power receiving apparatus in the still another embodiment of the present invention. In addition, the automatic matching box 23 of the electric power receiving side 2 realizes the impedance adjusting means in the noncontact electric power receiving apparatus in the still another embodiment of the present invention.

In addition, the LC variable circuit 234 shown in FIG. 7 realizes impedance adjusting means, the directional coupler 231 shown in FIG. 7 realizes detecting means, and the micom 233 shown in FIG. 7 realizes control means.

In addition, although in the embodiments described above, it has been described that the electric power receiving side 2, for example, is realized in the form of the mobile-phone unit or the like, the present invention is by no means limited thereto. That is to say, the present invention is suitably applied to various kinds of electronic apparatuses, each required to receive the electric power from the outside, such as a portable music player, a portable game machine, a digital still camera, a digital video camera, and an electronic databook, especially, a portable electronic apparatus which is carried to be utilized.

In addition, although in the embodiment described above, the description has been given with respect to the case where the present invention is applied to the noncontact electric power feeding system using the magnetic field resonance system, the present invention is by no means limited thereto. That is to say, the present invention can also be applied to the case where information is transmitted between near apparatuses by using the same system or the case where both the information and the electric power are transmitted in addition to the case where the electric power is fed or received in the manner described above.

In this case, since the transmission efficiency, as shown in FIG. 5, can be made broad, the various kinds of pieces of information can be precisely transmitted at a high speed.

In addition, although in the embodiments described above, the description has been given by exemplifying the case where the electric power is supplied in the noncontact style by using the magnetic field resonance system, the present invention can also be similarly applied not only to the case where the electric power is supplied in the noncontact style by using the magnetic field resonance system, but also to the case where the electric power is supplied in the noncontact style by using either the electric field resonance system or the electromagnetic resonance system.

The present application contains subject matter related to that disclosed in Japanese Priority Patent Application JP 2009-195172 filed in the Japan Patent Office on Aug. 26, 2009, the entire content of which is hereby incorporated by reference.

It should be understood by those skilled in the art that various modifications, combinations, sub-combinations and alterations may occur depending on design requirements and other factor in so far as they are within the scope of the appended claims or the equivalents thereof.

What is claimed is:

1. A noncontact electric power feeding apparatus, comprising:
a resonance element to supply an alternating current (A/C) electric power without contact in accordance with a resonance;
an A/C power source configured to generate the A/C electric power to be supplied to said resonance element; and
an automatic impedance adjusting circuit provided between said A/C power source and said resonance element to variably control an impedance in accordance with a coupling coefficient between said noncontact electric power feeding apparatus and an electric power feeding destination of the A/C electric power, the automatic impedance adjusting circuit including a three-port directional coupler coupled between the resonance element and the A/C power source to measure a magnitude of a reflected electric power, the coupling coefficient being determined by the automatic impedance adjusting circuit in accordance with the magnitude of a reflected electric power.

2. The noncontact electric power feeding apparatus according to claim 1, wherein said automatic impedance adjusting circuit comprises:
at least one of a variable inductor and a variable capacitor; and
a processor to control the at least one of the variable inductor and the variable capacitor to set the impedance in accordance with the coupling coefficient determined from the magnitude of the reflected electric power.

3. A noncontact electric power receiving apparatus, comprising:
a resonance element to receive an alternating current (A/C) electric power without contact with an electric power feeding source and in accordance with a resonance of a resonance element of the electric power feeding source;
a rectifying circuit to create a direct current (D/C) electric power from the A/C electric power received through said resonance element and to output the D/C electric power; and
an automatic impedance adjusting circuit provided between said resonance element and said rectifying circuit to variably control an impedance in accordance with a magnitude of a coupling coefficient between said noncontact electric power receiving apparatus and said electric power feeding source of the A/C electric power, the automatic impedance adjusting circuit including a three-port directional coupler coupled between the resonance element and the rectifying circuit to measure a magnitude of a reflected electric power, the coupling coefficient being determined by the automatic impedance adjusting circuit in accordance with the magnitude of a reflected electric power.

4. The noncontact electric power receiving apparatus according to claim 3, wherein said automatic impedance adjusting circuit comprises:
at least one of a variable inductor and a variable capacitor;
a processor to control the at least one of the variable inductor and the variable capacitor in accordance with the coupling coefficient determined from the magnitude of the reflected electric power detected in order to set the impedance.

5. A noncontact electric power feeding method, comprising:
measuring a magnitude of a reflected power using a three-port directional coupling coupled between an alternating current (A/C) power source that generates A/C power and an electric power feeding destination of the A/C electric power;
determining a coupling coefficient based on the magnitude of the reflected power; and
variably controlling an impedance in accordance with the coupling coefficient determined from the magnitude of the reflected power, the coupling coefficient being representative of a coupling between said A/C power source and a resonance element that supplies the A/C electric power from said A/C power source to another electronic apparatus without contacting the other electronic apparatus.

6. A noncontact electric power receiving method, comprising:
measuring a magnitude of a reflected power using a three-port directional coupling coupled between a resonance element of an electric power feeding source of an alternating current (A/C) electric power and a rectifying circuit that creates a direct current (D/C) electric power from the A/C electric power received through said resonance element to output the D/C electric power;
determining a coupling coefficient based on the magnitude of the reflected power; and
variably controlling an impedance in accordance with a magnitude of the coupling coefficient determined from the magnitude of the reflected power, the coupling coefficient being representative of a coupling between the electric power feeding source and the electric power feeding destination that receives the A/C electric power without contact.

7. A noncontact electric power feeding system, comprising:
a noncontact electric power feeding apparatus including:
a resonance element to supply an (A/C) alternating current electric power without contact and in accordance with a resonance,
an A/C power source configured to generate the A/C electric power to be supplied to said resonance element, and
an automatic impedance adjusting circuit provided between said A/C power source and said resonance element to variably control an impedance in accordance with a coupling coefficient between said noncontact electric power feeding apparatus and an electric power feeding destination of the A/C electric power, the automatic impedance adjusting circuit including a three-port directional coupler coupled between the resonance element and the A/C power source to measure a magnitude of a reflected electric power, the coupling coefficient being determined by the automatic impedance adjusting circuit in accordance with the magnitude of a reflected electric power; and
a noncontact electric power receiving apparatus including:
a resonance element to receive the A/C electric power without contact and in accordance with a resonance from said resonance element of said noncontact element power feeding apparatus,
a rectifying circuit to create a direct current (D/C) electric power from the A/C electric power received through said resonance element and to output the D/C electric power, and
an automatic impedance adjusting circuit provided between said resonance element and said rectifying circuit to variably control an impedance in accordance with a magnitude of a coupling coefficient between said noncontact electric power receiving apparatus and said electric power feeding source of the A/C electric power, the automatic impedance adjusting circuit including a three-port directional coupler coupled between the resonance element and the rectifying circuit to measure a magnitude of a reflected electric power, the coupling coefficient being determined by the automatic impedance adjusting circuit in accordance with the magnitude of a reflected electric power.

8. The noncontact electric power feeding apparatus according to claim 1, wherein the automatic impedance adjusting circuit adjusts the impedance to maintain the coupling coefficient between the noncontact electric power feeding apparatus and the electric power feeding destination as a distance between the noncontact electric power feeding apparatus and the electric power feeding destination varies.

9. The noncontact electric power receiving apparatus according to claim 3, wherein the automatic impedance adjusting circuit adjusts the impedance to maintain the coupling coefficient between the noncontact electric power receiving apparatus and the electric power feeding source as a distance between the noncontact electric power receiving apparatus and the electric power feeding source varies.

* * * * *